: 3,748,276
AQUEOUS GEL COMPOSITION CONTAINING POLYETHER POLYOL GELLING AGENTS
Irving R. Schmolka, Grosse Ile, Mich., assignor to BASF Wyandotte Corporation, Wyandotte, Mich.
No Drawing. Continuation-in-part of abandoned application Ser. No. 845,510, July 28, 1969. This application July 19, 1971, Ser. No. 163,989
Int. Cl. B01j 13/00
U.S. Cl. 252—316          5 Claims

ABSTRACT OF THE DISCLOSURE

Aqueous gel compositions for use in pharmaceutical and cosmetic applications are prepared employing polyether polyols as gelling agents. These polyether polyols are prepared by the copolymerization of low molecular weight alkylene oxides and α-olefin oxides containing from 14 to 20 carbon atoms with low molecular weight active hydrogen-containing compounds.

---

This application is a continuation-in-part application of copending application U.S. Ser. No. 845,510, filed July 28, 1969, now abandoned, and entitled, "Polyether Polyol Gelling Agents."

The present invention relates to the preparation of aqueous gel compositions. It is more particularly concerned with polyether polyol gelling agents.

The preparation of aqueous gels for use in pharmaceutical and cosmetic applications is well known in the art. The prior art teaches the use of gums, metallic soaps, and nitrocellulose as gelling agents. For example, U.S. 2,773,801 teaches the use of natural and synthetic gums and gumlike materials as gelling agents, U.S. 3,101,300 and U.S. 3,101,301 teach the combination of mineral oil, water, a higher fatty acid alkanolamide, and an aliphaic polyglycol ether phosphate as essential ingredients in a clear transparent gel. U.S. 3,342,569 teaches the use of mineral oil having a viscosity of 120 Saybolt seconds and above, in combination with water, as clear transparent gels.

It is an object of this invention to prepare aqueous gel compositions. It is a further object of this invention to prepare gel compositions utilizing a specific group of polyether polyols as gelling agents. Another object of this invention is to provide an improved gel for use in cosmetic and pharmaceutical applications. These and other objects of the invention will become apparent from the following disclosure.

It has been discovered that aqueous gels can be prepared by admixing water with a specific group of polyether polyols. The gels of this invention comprise from about 10 to 50 weight percent of the aforementioned polyether polyol with the balance of the composition being water. The compositions may also include water-soluble and/or water-insoluble pharmaceutical or cosmetically suitable ingredients. The polyether polyol used in this invention is the reaction product prepared by the copolymerization of a mixture of a low molecular weight alkylene oxide and an α-olefin oxide containing from 14 to 20 carbon atoms with a low molecular weight active hydrogen-containing compound. The mixing of the water and the polyether polyol is carried out in a temperature range of from 32 to 200° F. with the preferred temperature being from 60 to 160° F.

As used herein, the term "gel" is defined as a solid or semi-solid colloid containing considerable quantities of liquid linked in a coherent meshwork which immobilizes the liquid.

The gels of the instant invention have many uses in cosmetic and pharmaceutical applications. These gels are compatible with most of the known ingredients used in these applications. For example, the gels of this invention may be compounded with deodorants and anti-perspirants. Other uses of the gels of the instant invention include ointments, creams, foams, lotions, and salves. Examples shown hereinafter will illustrate typical pharmaceutical and cosmetic formulations but are not intended to be unduly restrictive upon the use of the gels of this invention.

The polyether polyols which are used in the practice of this invention are prepared by reacting ethylene oxide or a mixture of ethylene oxide and other low molecular weight alkylene oxides and an α-olefin oxide or a mixture of α-olefin oxides with low molecular weight hydrogen-containing compounds. The amount of low molecular weight alkylene oxide used in the reaction will vary so that the resulting polyol will contain from about 20 to 65% by weight of ethylene oxide whether the ethylene oxide is used singly or in combination with other low molecular weight alkylene oxines. The amount of α-olefin oxide required will be an amount sufficient to react with at least one active hydrogen of the active hydrogen-containing compound. More specificially, the amount of α-olefin oxide required will be from about 0.3 to 2.0 moles of oxide per active hydrogen group of the active hydrogen-containing compound. The copolymerization is carried out in the presence of a basic catalyst in an inert atmosphere at an elevated pressure and in a suitably heated reactor. The reaction may be conducted in the presence or in the absence of an inert organic solvent.

It has been found that in the preparation of the gel formulations of the present invention, not all polyether polyols which are prepared by the copolymerization of low molecular weight alkylene oxines and α-olefin oxides with low molecular weight active hydrogen-containing compounds may be used. More specifically, it has been found that the α-olefin must contain at least 14 carbon atoms, and the amount of ethylene oxide copolymerized with the α-olefin must be sufficient to provide a polymer which has a balanced hydrophobic-hydrophilic nature. It is believed that the behavior of these polymers can be explained on the basis of hydrate formation. It appears that the hydrophilic portion of the polymer attributed to the segment containing the low molecular weight active hydrogen-containing compound, together with the polymerized ethylene oxide, immobilizes the water. However, α-olefin oxides having less than 14 carbons do not exhibit sufficient hydrophobic properties to permit the formation of gels. Further, it has been found that in utilizing the α-olefin oxides of 14 and more carbon atoms, the hydrophilicity must be kept within bounds so that the unique hydrophobic properties are not impaired. For instance, enhanced hydrophilicity of the polymer will result in narrowing the gelation range. As more oxyethylene units are added to the polymer, the hydrophilic portion of the polymer loses its affinity for immobilizing the water and the resulting polymer in this case, instead of decreasing the gelation range, will exhibit no gelation characteristics at all. Thus, it has been found that compounds derived from the α-olefin oxides having from 14 to 20 carbons do not exhibit gelation properties if the oxyethylene content of the polymer exceeds 65% by weight of the polymer.

The active hydrogen-containing compounds that are used in the preparation of these polyols are the polyhydric alcohols having from about 2 to 10 carbon atoms and from two to six hydroxyl groups. These include, for example, alkane alcohols, such as, ethylene glycol, propylene glycol, 1,4-butane diol, 1,2-butane diol, trimethylolpropane, glycerol, 2,3,5,6-hexane tetrol, glucose, sorbitol, pentaerythritol, and the like; alkene alcohols, such as, 2 - butene - 1,4-diol, 1,5-hexadiene-3,4-diol, 2-hexene-1,4,6-triol, 3-heptene-1,2,6,7-tetrol, and the likes; alkyne alcohols, such as 2-butyne-1,4-diol, 2-hexyne-1,4,6-triol, 4-octyne-1,2,7,8-tetrol, and the like; and oxyalkylene alcohols, such as diethylene glycol, triethylene glycol, tetraethylene glycol, dipropylene glycol, tripropylene glycol, and the like.

The α-olefin oxides which are used in this invention are those oxides containing from about 14 to 20 carbon atoms. These include, for example, tetradecylene oxide, pentadecylene oxide, hexadecylene oxide, heptadecylene oxide, octadecylene oxide, nonadecylene oxine, eicosylene oxide and mixtures thereof.

The low molecular weight alkylene oxides that are used in the practice of this invention are alkylene oxides containing from 2 to 4 carbon atoms. These include, for example, ethylene oxide, 1,2-propylene oxide, 1,3-propylene oxide, 1,2-butylene oxide, 1,3-butylene oxide, 1,4-butylene oxide, and 2,3-butylene oxide.

Any suitable prior art alkaline catalyst can be used in preparing the polyether polyols used in the practice of this invention. These include, for example, strong bases, such as sodium hydroxide, sodium methylate, potassium hydroxide, and the like; salts of strong bases with weak acids, such as sodium acetate, sodium glycolate, and the like and quaternary ammonium compounds, such as benzyl dimethyl cetyl ammonium hydroxide, and the like. The concentration of these catalysts in the reaction mixture is not critical and may vary from about 0.1% to 5% by weight of the polyhydric alcohol reactant.

More specifically, the polyether polyols are prepared by mixing a low molecular weight polyhydric alcohol containing from two to ten carbon atoms and from two to six hydroxyl groups with from 0.3 to 2.0 moles of α-olefin oxide per active hydrogen of the alcohol; heating said mixture to a temperature in the range of about 50° C. to 150° C., preferably from 80° C. to 130° C. under an inert gas pressure preferably from about 34 p.s.i.g. to 90 p.s.i.g.; adding ethylene oxide or a mixture of ethylene oxide and other alkylene oxides having from three to four carbon atoms to said mixture in an amount so that the resulting polyether polyol product will contain from 20% to 65% by weight ethylene oxide; and maintaining said mixture at a temperature and pressure in said range for a period of about one hour to ten hours, preferably one to three hours. If desired a catalyst may be added to the reaction mixture prior to the ethylene oxide addition. Alkaline catalysts such as potassium hydroxide or acid catalysts such as boron trifluoride are useful as is well established in the art. Generally, the amount of ethylene oxide utilized, whether singularly or in admixture with other low molecular weight alkylene oxides, will be from about 1 to 8 moles per mole of polyhydric alcohol.

The aqueous gel compositions of the present invention may also include pharmaceutical and cosmetically active ingredients. The pharmaceutically active ingredients include, for example, antifungal agents, such as, hexetidine, triacetin, nystatin, griseofulvin, benzoic acid and 8-hydroxy quinoline, and the like; local anesthetic agents, such as, benoxinate hydrochloride, amolenone hydrochloride, cyclomethycaine sulfate, and the like; anti-biotics, such as sodium chloramphenicol succinate, kanamycin sulfate, neomycin sulfate, and the like; anti-bacterial agents, such as, nitrofurazone, sodium sulfacetamide, and the like; and scabicides, such as, benzyl benzoate, n-ethyl-o-crotonotoluide, hexachlorocyclohexane and the like. The cosmetically active ingredients, include, for example, ammonium thioglycolate, useful in cold waving creams, lanolin and ethoxylated lanolin, useful in hand creams, mineral oil, useful in moisturizing creams, and amyl p-dimethyl aminobenzoate, useful in sunburn preventive creams, and the like.

In accordance with this invention, a gel is prepared by mixing from about 10 to 50 parts by weight of a polyether polyol described above in about 90 to 50 parts by weight of water. Other additives, such as pharmaceutical and cosmetically active ingredients may also be added. In a preferred method, the gels are prepared by miving the polyether polyol with the water at a temperature of from about 60 to 160° F. When other active ingredients are added, the ingredients are added to the water and thoroughly mixed prior to the addition of the polyether polyol. The temperature of the mixture is then brought to from about 60 to 160° F., thereby forming a gel containing the ingredients dispersed therein.

A more comprehensive understanding of the invention can be obtained by considering the following examples. However, it should be understood that the examples are not intended to be unduly limitative of the invention.

EXAMPLES I–VIII

The following examples illustrate the gelling properties of the polyether polyols of the present invention.

Ten grams of a polyether polyol were placed in a 100 milliliter beaker. To this polyol, water was added until a gel was formed. Water additions were continued with mixing until the gel reverted back to a liquid.

The following polyether polyols were used in the examples:

Polyol A—This polyether polyol was prepared by the reaction of 1 mole of glycerol, 1 mole of a mixture of α-oleln oxides having from 15 to 18 carbon atoms, and 4.4 moles of ethylene oxide.

Polyol B—This polyether polyol was prepared by the reaction of 1 mole of glycerol,, one mole of a mixture of α-olefin oxides having from 15 to 18 carbon atoms, and 6.65 moles of ethylene oxide.

Polyol C—This polyether polyol was prepared by the reaction of 1 mole of glycerol, 1 mole of octadecylene oxide and 3 moles of ethylene oxide.

Polyol D—This polyether polyol was prepared by the reaction of 1 mole of glycerol, 2 moles of an α-olefin oxide having from 15 to 18 carbon atoms and 8 moles of ethylene oxide.

Polyol E—This polyether polyol was prepared by the reaction of 1 mole of glycerol, 2 moles of tetradecylene oxide, and 3 moles of ethylene oxide.

Polyol F—This polyether polyol was prepared by the reaction of 1 mole of 1,4-butane diol, 1 mole of hexadecylene oxide and 4 moles of ethylene oxide.

Polyol G—This polyether polyol was prepared by the reaction of 1 mole of trimethylolpropane, 1 mole of an α-olefin oxide having from 15 to 18 carbon atoms, and 3 moles of a mixture of ethylene oxide and propylene oxide. The ethylene oxide and propylene oxide mixture contained 95 parts by weight ethylene oxide to 5 parts by weight of propylene oxide.

Polyol H—This polyether polyol was prepared by the reaction of 1 mole of propylene glycol, 2 moles of eicosylene oxide and 8 moles of ethylene oxide.

Table 1 below illustrates the gel ranges for the eight aforementioned polyether polyols of the present invention.

TABLE 1

| Example | Polyether polyol | Gelation range | | | |
|---|---|---|---|---|---|
| | | Max. Gelation starts | | Min. Reversion to liquid | |
| | | Mls. water | Percent polyol by weight | Mls. water | Percent polyol by weight |
| I | A | 17 | 37 | 50 | 16.7 |
| II | B | 20 | 33 | 40 | 20 |
| III | C | 15 | 40 | 56 | 15 |
| IV | D | 18.5 | 31 | 30 | 25 |
| V | E | 10 | 50 | 56 | 15 |
| VI | F | 18.5 | 35 | 49 | 17 |
| VII | G | 15 | 40 | 30 | 25 |
| VIII | H | 10 | 50 | 56 | 15 |

From the above table, it can be seen that gels form in a polyether polyol-water mixture when the polyol is in a concentration of from 15 to 50% by weight.

Examples IX through XII below show practical applications of the gels. The procedure used in making the formulations of Examples X through XII is the same as described below in Example IX.

EXAMPLE IX

An opaque, creamy gel was made that may be used as a cold waving cream. The formulation contained:

| | Parts by weight |
|---|---|
| Polyol B | 36.1 |
| Ammonium thioglycolate | 10.7 |
| Water | 53.2 |
| | 100.0 |

The gel was prepared by dissolving the ammonium thioglycolate in water at ambient temperature. Polyol B was then added to the mixture. A gel having a firm jelly-like consistency was formed.

EXAMPLE X

A fungistat ointment for treating athlete's foot was prepared having the following composition:

| | Parts by weight |
|---|---|
| Polyol B | 27.4 |
| 8-hydroxy quinoline | 0.6 |
| Water | 72.0 |
| | 100.0 |

EXAMPLE XI

An opaque gel useful as a preventative for sunburn was prepared having the following composition:

| | Parts by weight |
|---|---|
| Polyol A | 18.0 |
| Amyl p-dimethyl aminobenzoate | 2.0 |
| Water | 80.0 |
| | 100.0 |

EXAMPLE XII

A stable transparent gel useful as an anti-fungal ointment was prepared having the following composition:

| | Parts by weight |
|---|---|
| Polyol A | 18.4 |
| Benzoic acid | 3.0 |
| Water | 78.6 |
| | 100.0 |

What is claimed is:
1. An aqueous gel composition consisting essentially of:
 (A) from about 10 parts by weight of a polyether polyol prepared by copolymerizing at a temperature of from 50° C. to 150° C. for one hour to ten hours under an inert gas pressure
  (1) a mixture of (a) a low molecular weight alkylene oxide selected from the group consisting of ethylene oxide and a mixture of ethylene oxide containing from 3 to 4 carbon atoms, and (b) an α-olefin oxide containing from 14 to 20 carbon atoms with
  (2) an alkane alcohol having from 2 to 10 carbon atoms and from 2 to 6 hydroxyl groups in a mole ratio of α-olefin oxide to active hydrogen of the alcohol of from 0.3:1 to 2:1, the amount of ethylene oxide employed being such to provide a polyether polyol containing from 20% to 65% by weight ethylene oxide, and
 (B) from about 90 parts to 50 parts by weight of water.
2. An aqueous gel composition as defined in claim 1 wherein the α-olefin oxide is selected from the group consisting of tetradecylene oxide, hexadecylene oxide, octadecylene oxide, eicosylene oxide, and a mixture of α-olefin oxides containing from 15 to 18 carbon atoms.
3. An aqueous gel composition as defined in claim 1 wherein the alkane alcohol is selected from the group consisting of glycerol, 1,4-butane diol, trimethylolpropane, propylene glycol, and ethylene glycol.
4. The aqueous gel composition of claim 1 wherein the low molecular weight alkylene oxide is ethylene oxide.
5. The aqueous gel composition of claim 1 wherein the low molecular weight alkylene oxide is the mixture of ethylene oxide and a low molecular weight alkylene oxide containing from 3 to 4 carbon atoms.

References Cited
UNITED STATES PATENTS

| | | | |
|---|---|---|---|
| 2,875,153 | 2/1959 | Dalton | 252—316 X |
| 3,031,510 | 4/1962 | Crecelius | 260—615 B X |
| 3,240,819 | 3/1966 | Gaertner et al. | 260—615 B |
| 3,304,262 | 2/1967 | Corey | 252—316 X |
| 3,317,508 | 5/1967 | Winquist, Jr. et al. | 260—615 B X |
| 3,427,248 | 2/1969 | Lamberti et al. | 260—615 B X |
| 3,637,869 | 1/1972 | Seizinger | 260—615 B |

RICHARD D. LOVERING, Primary Examiner

U.S. Cl. X.R.

252—351, DIG. 1; 260—615 B; 424—60, 72, 258, 317

PO-1050
(5/69)

UNITED STATES PATENT OFFICE
CERTIFICATE OF CORRECTION

Patent No. 3,748,276          Dated July 24, 1973

Inventor(s) Irving R. Schmolka

It is certified that error appears in the above-identified patent and that said Letters Patent are hereby corrected as shown below:

Column 5, line 50, after the word "parts" the phrase --to 50 parts-- should be inserted.

Column 6, line 6, after the word "oxide" the phrase --and a low molecular weight alkylene oxide-- should be inserted.

Signed and sealed this 20th day of November 1973.

(SEAL)
Attest:

EDWARD M.FLETCHER,JR.          RENE D. TEGTMEYER
Attesting Officer          Acting Commissioner of Patents